(12) United States Patent
Iijima et al.

(10) Patent No.: US 9,235,910 B2
(45) Date of Patent: Jan. 12, 2016

(54) GRAPHICS RENDERING AND EDITING APPARATUS AND METHOD

(75) Inventors: Tadahiko Iijima, Yokohama (JP); Noriaki Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 12/419,109

(22) Filed: Apr. 6, 2009

(65) Prior Publication Data

US 2009/0251489 A1 Oct. 8, 2009

(30) Foreign Application Priority Data

Apr. 8, 2008 (JP) ................................ 2008-100625
Jan. 21, 2009 (JP) ................................ 2009-011367

(51) Int. Cl.
*G09G 5/00* (2006.01)
*G06T 11/60* (2006.01)

(52) U.S. Cl.
CPC . *G06T 11/60* (2013.01); *G09G 5/00* (2013.01)

(58) Field of Classification Search
CPC ... G06T 3/0018; G06T 3/0481; G06T 3/0093; G06T 5/006; G06T 15/20; G06T 17/20; G06T 11/80; G09G 5/00; G06F 2203/04805
See application file for complete search history.

(56) References Cited

U.S. PATENT DOCUMENTS

| | | | |
|---|---|---|---|
| 6,111,588 A * | 8/2000 | Newell | 345/442 |
| 6,992,671 B1 * | 1/2006 | Corona | 345/467 |
| 7,408,553 B1 * | 8/2008 | Toksvig et al. | 345/441 |
| 2010/0014746 A1 * | 1/2010 | Warnke et al. | 382/141 |
| 2010/0261526 A1 * | 10/2010 | Anderson et al. | 463/31 |

FOREIGN PATENT DOCUMENTS

| | | |
|---|---|---|
| JP | 61-286977 A | 12/1986 |
| JP | H03-296868 A | 12/1991 |
| JP | H11-503540 A | 3/1999 |
| JP | 2002-63586 A | 2/2002 |
| JP | 2002063586 * | 2/2002 |
| JP | 2004-213221 A | 7/2004 |
| JP | 2005-028051 A | 2/2005 |

OTHER PUBLICATIONS

Saga, et al., "A Freehand CAD Drawing Interface Based on the Fuzzy Spline Curve Identifier", Systems, Man and Cybernetics, 1995. Intelligent Systems for the 21st Century, IEEE International Conference (vol. 3 ) pp. 338-350, vol. 36, No. 2.

* cited by examiner

*Primary Examiner* — Mark Zimmerman
*Assistant Examiner* — Michelle Chin
(74) *Attorney, Agent, or Firm* — Canon U.S.A., Inc. IP Division (57) ABSTRACT

A graphics rendering and editing apparatus includes a rendering unit configured to render a graphic object, a position specifying unit configured to specify a pre-change position and a post-change position of an arbitrary point on the graphic object, an attribute specifying unit configured to specify a deformation attribute of the graphic object, the deformation attribute being related to how the graphic object is deformed as a position of the arbitrary point changes, and a deformation unit configured to deform, when the position specifying unit has specified the pre-change position and the post-change position the graphic object in accordance with the pre-change position, the post-change position, and the attribute specified by the attribute specifying unit.

12 Claims, 7 Drawing Sheets

FIG. 4A CREATE STRAIGHT LINE OBJECT

FIG. 4B SPECIFY FIXED POSITION

FIG. 4C SET VISCOSITY ATTRIBUTE

FIG. 4D SELECT DEFORMATION TOOL, SET SHARPNESS ATTRIBUTE

FIG. 4E DRAG WITH PEN

FIG. 4F CREATE CURVE

| | SHARPNESS | | |
|---|---|---|---|
| | 0.8 | 1.5 | 4 |
| VISCOSITY | 1 | 1.25 | 0.67 | 0.25 |
| | 0.6 | 0.75 | 0.40 | 0.15 |
| | 0.4 | 0.50 | 0.27 | 0.10 |

GRAPHICS RENDERING AND EDITING APPARATUS AND METHOD

BACKGROUND OF THE INVENTION

1. Field of the Invention

The present invention relates to a graphic rendering and editing apparatus and method for deforming graphic objects.

2. Description of the Related Art

A graphic rendering and editing apparatus may execute a rendering program that may dispose a graphic object, set up the graphic object, and edit the individual object. The rendering program may include a program that creates a curve by adding curve-control points of, for example, a Bezier curve, to a straight line and a curve. The rendering program renders a curve by first creating a line, then adding curve-control points, and then setting weights representing influences of the curve-control points.

Japanese Patent Laid-Open No. 2002-63586 discloses an apparatus that creates a curve fitted to the shape of a graphic object, such as a circle or an ellipse. The apparatus creates the curve fitted to the graphic object by fixing one end of a straight line and dragging and moving another end so as to surround the graphic object. A desired curve can be created with a small number of steps when the desired curve is a part of an existing graphic object.

However, in the rendering program that renders a curve by adding curve-control points and setting weights for the curve-control points, the relationship between curved portions and the positions of curve-control points may be complicated. Therefore, in order to create a desired curve, a user has to perform a large number of input operations. Moreover, in order to create a curve with a plurality of inflection points, such as a wavy line, a user has to add control points for the inflection points, which also requires the user to perform a large number of input operations.

The apparatus described in Japanese Patent Laid-Open No. 2002-63586 creates a curve such that the curve surrounds and fits to a graphic object, and the user has to prepare many graphic objects when there are no existing objects available for rendering a target curve, which requires the user to perform a large number of input operations. Furthermore, in order to further curve a middle portion of a curve once created, a user has to set a fixed end in the curve and drag another end such that the curve surrounds and fits to a graphic object, which requires the user to drag the other end over a long distance.

SUMMARY OF THE INVENTION

The present invention provides a graphics rendering and editing apparatus and method that reduces user input operations for deforming a graphic object.

According to an aspect of the present invention, a graphics rendering and editing apparatus includes a rendering unit configured to render a graphic object, a position specifying unit configured to specify a pre-change position and a post-change position of an arbitrary point on the graphic object, an attribute specifying unit configured to specify a deformation attribute of the graphic object, the deformation attribute being related to how the graphic object is deformed as a position of the arbitrary point changes, and a deformation unit configured to deform, when the position specifying unit has specified the pre-change position and the post-change position, the graphic object in accordance with the pre-change position, the post-change position, and the attribute specified by the attribute specifying unit.

In accordance with an aspect of the present invention, once a deformation attribute of a graphic object is specified, the graphic object can be deformed by only specifying a pre-change position and a post-change position of an arbitrary point by dragging or the like. User input operations for deforming a graphic object are reduced as a result.

Further features of the present invention will become apparent from the following description of exemplary embodiments with reference to the attached drawings.

DESCRIPTION OF THE EMBODIMENTS

Figure 1:
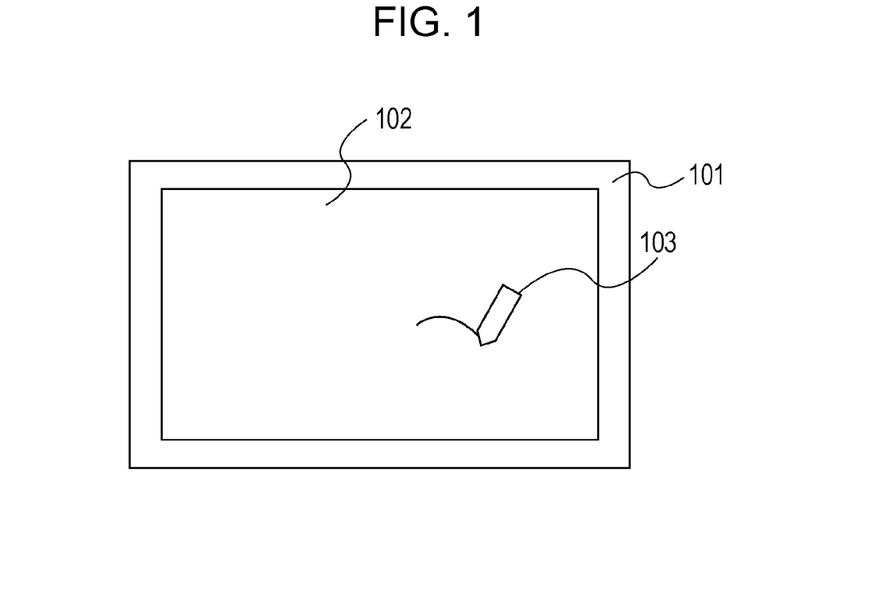
FIG. 1 is a schematic view showing a graphics rendering and editing apparatus according to an embodiment of the present invention.
Figure 2:
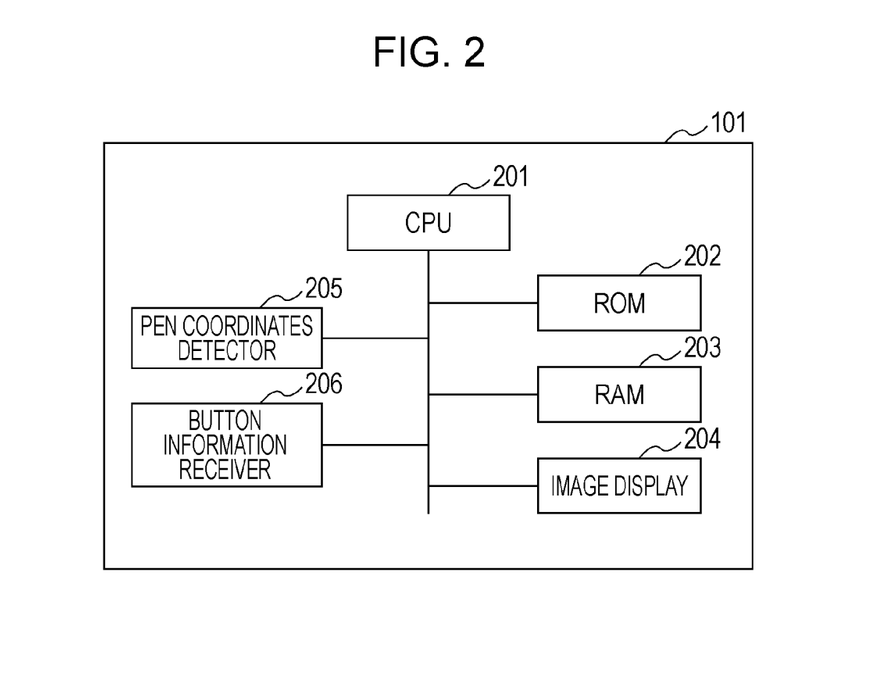
FIG. 2 is a block diagram showing a functional structure of the graphics rendering and editing apparatus according to an embodiment of the present invention.

A display 101 is a device for implementing a graphics rendering and editing apparatus according to an exemplary embodiment of the invention. The display 101 includes a CPU 201, a ROM 202, a RAM 203, an image display 204, a pen coordinates detector 205, and a button information receiver 206.

The image display 204 has a display panel, and displays image data on a screen 102 in accordance with an instruction from the CPU 201. The pen coordinates detector 205 has a digitizer function, and detects the position of a pen 103 on the screen 102. The pen coordinates detector 205 detects the position of the pen 103 by monitoring how light is blocked when the screen 102 is irradiated with light from above. The positions of the pen 103 and its tip may also be electromagnetically or electrostatically detected. The button information receiver 206 receives button information of the pen 103 transmitted from the pen 103 with infrared rays. The term "button information" refers to information about whether a button disposed on the tip of the pen 103 is pressed. In other words, button information is information about whether the pen 103 is pressed against the screen 102 and in an operative condition. The CPU 201 controls the entire operation of the display 101 in accordance with a control program stored in the ROM 202, and performs I/O control and processing of various data. The ROM 202 stores the control program and various data. The RAM 203 is used as a work area when the CPU 201 executes the control program, and temporarily stores operation results, coordinates data, etc.

The tip of the pen 103 includes a pressure-sensitive sensor that also serves as a switch, thereby allowing the pen 103 to be electrically operative while the pen 103 is being pressed against the screen 102. While the switch is on, the pen 103 continuously transmits button information to the display 101 with infrared rays.

Figure 3:
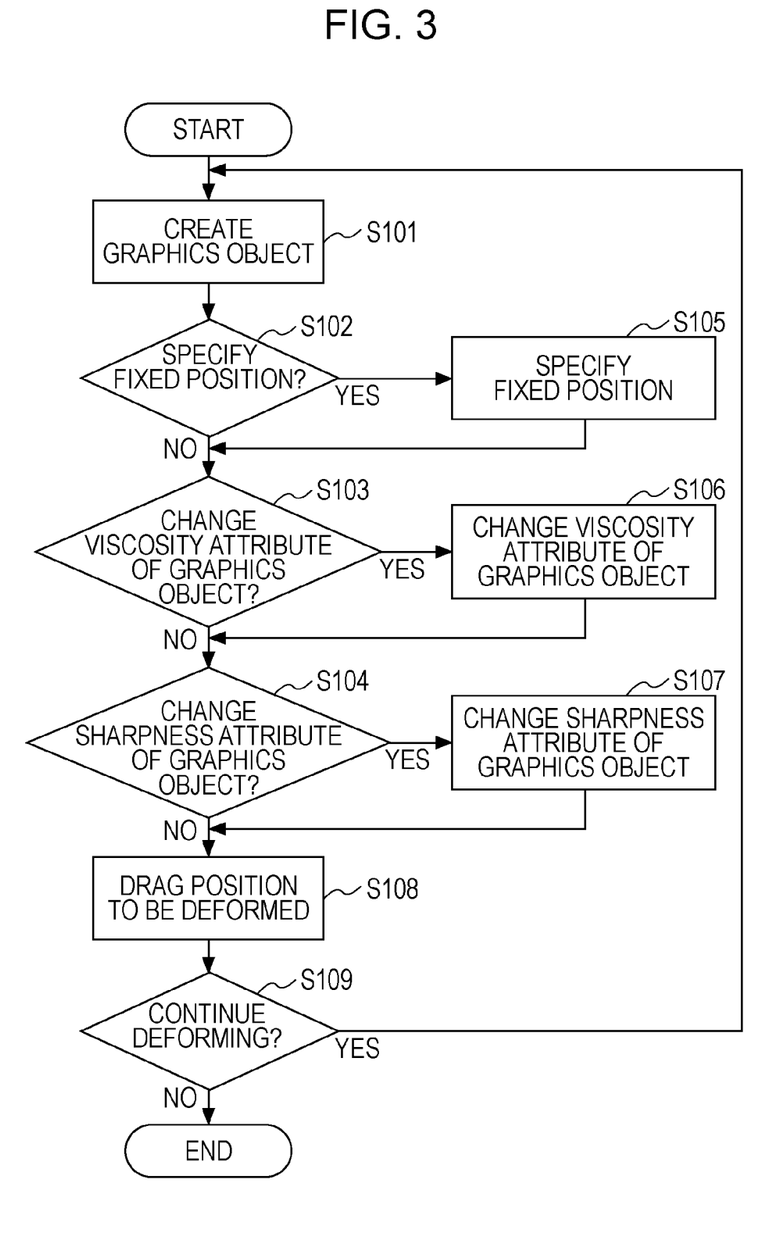
FIG. 3 is a flowchart showing operations of the graphics rendering and editing apparatus according to an embodiment of the present invention.

An operation for deforming an object (execution of an object deformation method) with the graphics rendering and editing apparatus will now be described. FIG. 3 is a flowchart showing an operation of the graphics rendering and editing apparatus. A program for performing this process is stored in the ROM 202 and executed under the control of the CPU 201.

Figure 4A:
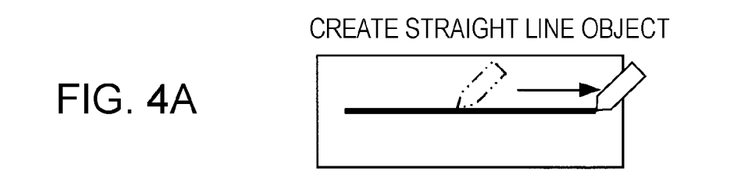
FIGS. 4A to 4F are schematic views of the graphics rendering and editing apparatus according to an embodiment of the present invention under operation.

The CPU 201 creates a graphic object in step S101. The CPU 201 creates a graphic object as a user operates the pen 103. For example, as shown in FIG. 4A, when the user selects a straight line rendering mode and moves the pen 103 while pressing the pen 103 against the screen 102 (hereinafter referred to as "dragging"), a straight line object is created as the graphic object. The image display 204 displays the straight line object on the screen 102. The term "straight line" used herein refers to a "finite straight line (line segment)."

Figure 4B:
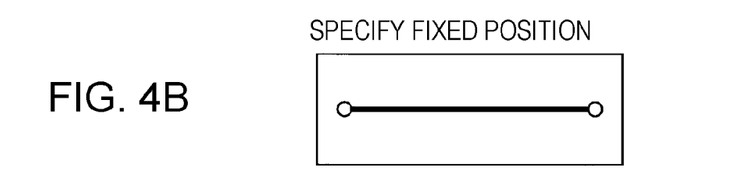

In step S102, the CPU 201 determines whether to specify a fixed position on the graphic object. When specifying a fixed position, the CPU 201 specifies the fixed position in step S105 and switches to step S103. Whether to specify a fixed position is determined from, for example, information input by the user (information about whether the user has selected a mode to specify a fixed position). In step S105, as shown in FIG. 4B, when the user specifies, for example, both ends of the straight line object as points to be fixed in the straight line object with the pen 103, the CPU 201, which serves as a fixed point specifying unit, specifies both the ends as fixed points. With this operation, both the ends of the straight line object are fixed and immobilized. When the CPU 201 determines not to specify a fixed position in step S102, the CPU 201 switches to step S103.

Figure 4C:
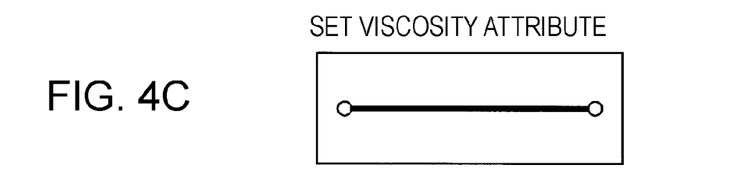
Figure 5:
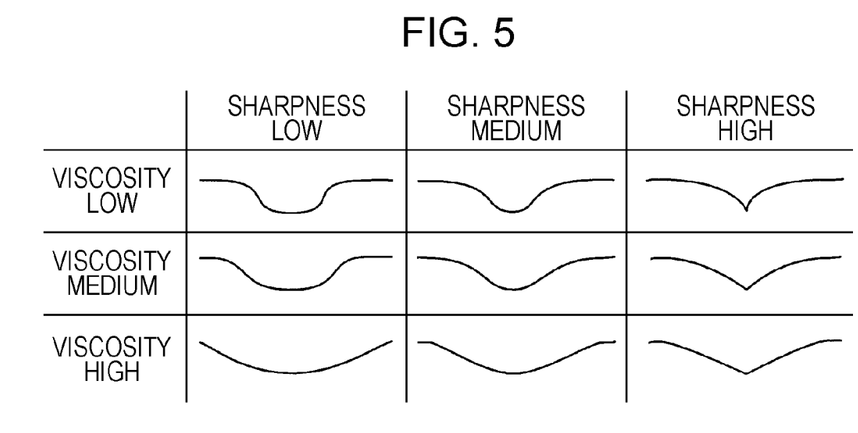
FIG. 5 is a schematic view showing examples of influence of viscosity attribute and sharpness attribute on a straight line object.

In step S103, the CPU 201 determines whether to change the viscosity attribute of the graphic object. When changing the viscosity attribute, the CPU 201 sets the viscosity attribute of the graphic object in step S106 and switches to step S104. Whether to change the viscosity attribute is determined from, for example, information input by the user. Because the viscosity attribute is expressed by, for example, a numerical value, the graphic object does not change as shown in FIG. 4C. The term "viscosity attribute" refers to an attribute that represents how near a certain position (pre-change position) in an object can approach a post-change position specified by dragging. The viscosity attribute corresponds to the viscosity of the line of the graphic object when the line is regarded as a viscous body. As shown in FIG. 5, when the viscosity attribute is high, parts of the line far from the post-change position are moved in the drag direction and the line becomes a curve with a small curvature. When the viscosity attribute is low, only the parts of the line near the post-change position are deformed and the line becomes a curve with a large curvature. The deformation of a graphic object is expressed by, for example, a normal distribution around a drag position expressed by equation (1) below:

$$f(x) = \frac{1}{\sqrt{2\pi}\,\sigma} \exp\left\{\frac{-(x-\mu)^2}{2\sigma^2}\right\} \times \text{drag distance} \quad (1)$$

$$\sigma = \frac{(\text{viscosity})}{(\text{sharpness})}$$

$$\mu = (\text{drag start position})$$

Figure 6:
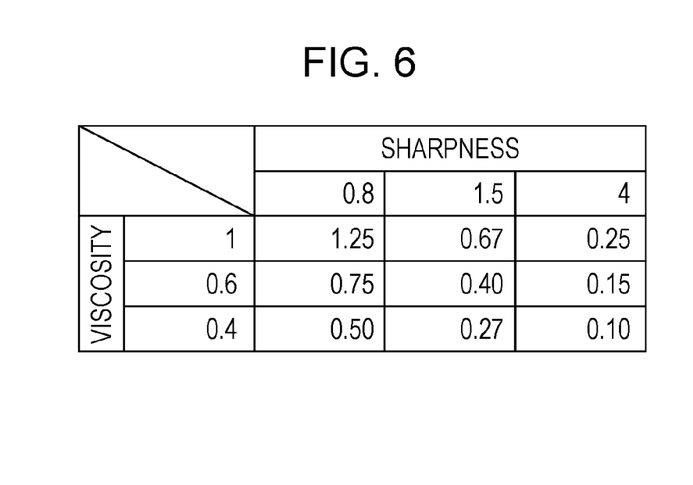
FIG. 6 is a table showing an example of the relationship between variance σ and the combination of sharpness and viscosity.

Using this equation, the value of variance σ can be changed by changing the combination of sharpness and viscosity as shown in FIG. 6, whereby deformations of various types can be performed.

When the user inputs a value for the viscosity attribute, the CPU 201, which serves as an attribute specifying unit, specifies the viscosity attribute among the attributes. When the CPU 201 determines not to change the viscosity attribute in step S103, the CPU 201 switches to step S104 without performing step S106.

Figure 4D:
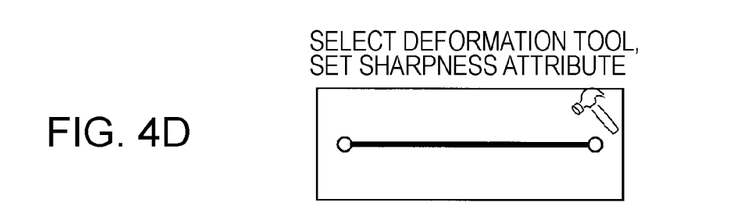

In step S104, the CPU 201 determines whether to change the sharpness attribute of a deformation tool. When changing the sharpness attribute, the CPU 201 sets the sharpness attribute of the deformation tool in step S107 and switches to step S108. Whether to change the sharpness attribute is determined, for example, from information input by a user (information about the selection of a deformation mode). As shown in FIG. 4D, if a hammer icon has been set as the tool for switching to a specified deformation mode and the hammer icon is selected, the CPU 201 switches to step S107. Because the sharpness attribute is expressed by, for example, a numerical value, the graphic object itself does not change as shown in FIG. 4D. The term "sharpness attribute" refers to an attribute representing the curvature at a dragged position. The sharpness attribute corresponds to a sharpness of a line of a graphic object after being deformed. As shown in FIG. 5, when the sharpness attribute is high, the curvature of the curve becomes large to provide a sharp curve. When the sharpness attribute is low, the curvature becomes small to provide a gentle curve. When a user inputs a value for the sharpness attribute, the CPU 201, which serves as the attribute specifying unit, specifies the sharpness attribute among the attributes. When the CPU 201 determines not to change the sharpness attribute in step S104, the CPU 201 switches to step S108 without performing step S107.

Figure 4E:
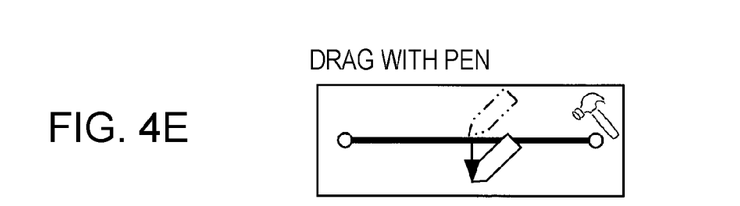
Figure 4F:
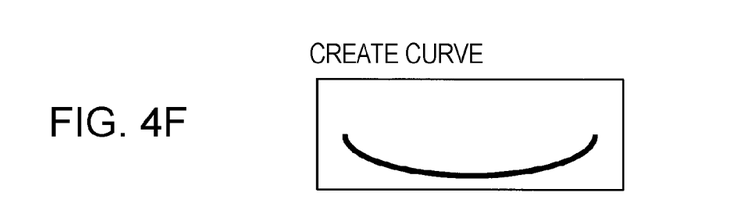

As shown in FIG. 4E, in step S108, the CPU 201 allows the user to drag an arbitrary point on the straight line object with the pen 103. As a result, the CPU 201, which serves as a position specifying unit, specifies a pre-change position and a post-change position of the arbitrary point. Then, the CPU 201 adds a drag starting point as a control point for the drag operation. As shown in FIG. 4F, the CPU 201 creates a curve around the control point while incorporating the amount of displacement of the pen 103, the viscosity attribute, and the sharpness attribute. The curve is displayed on the screen 102 by the image display 204. When a fixed point is not specified in step S102, a curve may be created by setting a specific point in the graphic object as the fixed point. Examples of the specific point include each endpoint of the straight line object and a point separated by a specified distance from the drag starting point. A fixed point may be set by default or may be set by the user beforehand.

In step S109, the CPU 201 determines whether to continue deformation. When continuing deformation, the CPU 201 switches to step S101. Whether to continue deformation is determined, for example, from information input by the user.

With the graphics rendering and editing apparatus, the input operations for creating a complicated curve can be reduced.

Figure 7A:
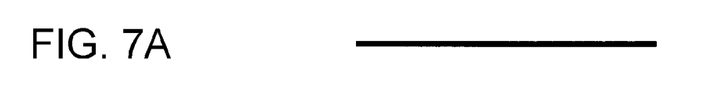
FIGS. 7A to 7E are schematic views showing an example of rendering a rectified waveform.
Figure 7B:
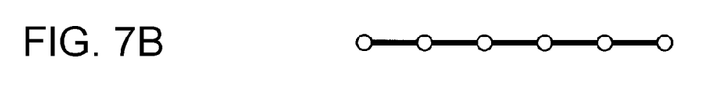
Figure 7C:
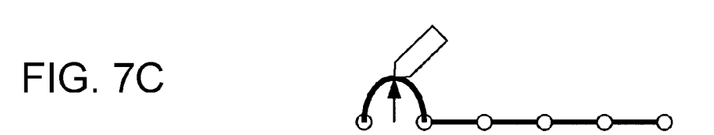
Figure 7D:
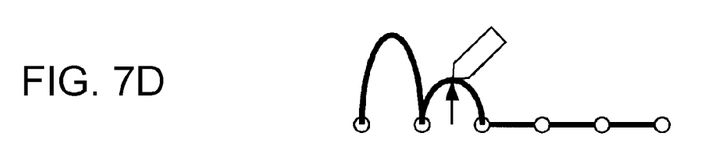
Figure 7E:
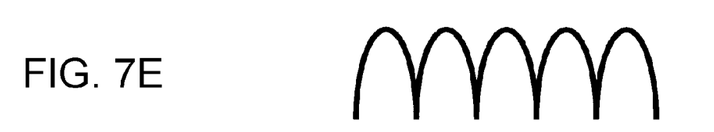

FIGS. 7A thru 7E show an example of rendering a rectified waveform. As shown in FIG. 7A, a straight line is rendered (step S101). In FIG. 7B, points to be fixed are specified (steps S102 to S105). In FIG. 7C, a part to become a wave is dragged (steps S103 to S108). Thereafter, as shown in FIG. 7D, another part to become a wave is dragged (steps S109 to S108). By repeating these steps, a rectified waveform is completed as shown in FIG. 7E.

In order to render such a rectified waveform with control points using a Bezier curve, a weight for each of the control points has to be adjusted. In contrast, with the present embodiment, the rectified waveform can be rendered with a small number of operations as shown in FIGS. 7A to 7E.

Figure 8A:
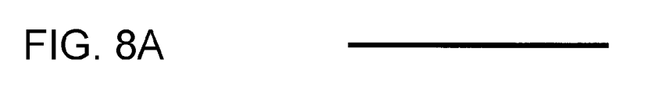
FIGS. 8A to 8E are schematic views showing an example of rendering a decay waveform.
Figure 8B:
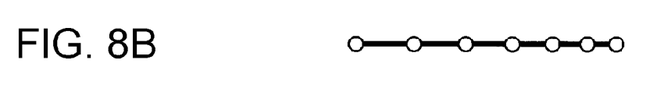
Figure 8C:
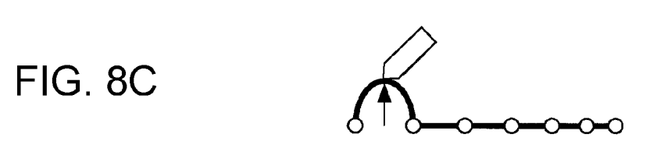
Figure 8D:
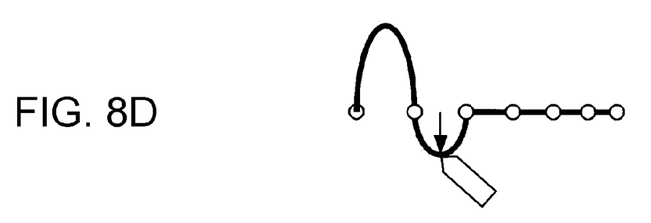
Figure 8E:
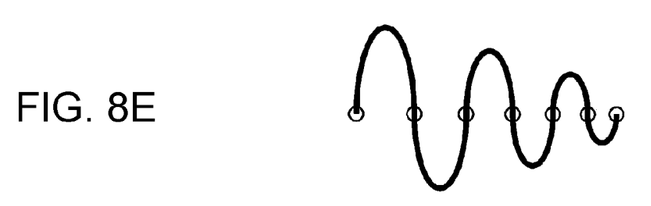

FIGS. 8A to 8E show an example of rendering a decay waveform. As shown in FIG. 8A, a straight line is rendered (step S101). Second, as shown in FIG. 8B, points to be fixed are specified (steps S102 to S105). Then, as shown in FIG. 8C, a part to become a wave is dragged (steps S103 to S108). Thereafter, as shown in FIG. 8D, another part to become a wave is dragged (steps S109 to S108). By repeating these steps, a decay waveform is completed as shown in FIG. 8E.

In order to render such a decay waveform with control points using a Bezier curve, a weight for each of the control points has to be adjusted as in the case of the rectified waveform. In contrast, with the present embodiment, the decay waveform can be rendered with a small number of operations as shown in FIGS. 8A to 8E.

As shown in these examples, a curve object in the shape of a parabola is created by selecting a combination of parabolas and then dragging a part of a straight line object. In this way, a curve expressed by a complicated equation can be rendered with a small number of input operations.

A graphic object to be deformed is not limited to a straight line object. A curved object, a closed curved object, or the like, can be a graphic object to be deformed.

Instead of first creating a graphic object and then setting its viscosity attribute, a viscosity attribute may be first set and then a graphic object with the viscosity attribute may be created.

In the above-described embodiment, a deformation mode is first selected and then a sharpness attribute is set. However, a sharpness attribute may be configured to be set as soon as an icon is selected, by preparing one or more icons besides the hammer icon and allocating a different sharpness attribute for each icon. Alternatively, an icon may be deformed as the sharpness attribute is changed.

Drag speed may be taken into account in creating a curve. A curve may be created in accordance with the amount of displacement and the speed of drag operation, a viscosity attribute, and a sharpness attribute. For example, in a state in which the viscosity attribute and the sharpness attribute for a straight line have not been set, a lower viscosity is set for a higher drag speed, and a higher viscosity is set for a lower drag speed. The drag speed may be taken into account such that the drag speed affects the breadth and the depth of deformation. Moreover, a graphic object may be deformed by assuming that a straight line object is a beam, applying a load to the beam, and yielding a deflection curve on the basis of the rigidity of the beam. Furthermore, a graphic object may be deformed by yielding a deflection curve on the basis of the magnitude and the range of the load.

It is not necessary to set a viscosity attribute and a sharpness attribute in accordance with information input from the outside. Instead, a viscosity attribute and a sharpness attribute may be preset for each type of curve to be rendered by dragging. For example, when a curve such as a parabola, a partial ellipse, or a partial sine curve is created by dragging, a combination of the viscosity attribute, the sharpness attribute, and the speed attribute may be preset for each curve.

A curve in three-dimensional space may be created. Moreover, not only a curve but also a curved surface may be created in three-dimensional space by dragging a part of a plane.

Figure 9:
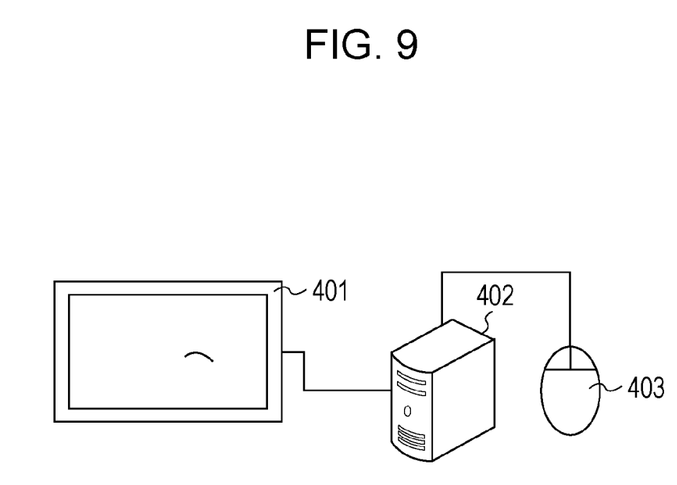
FIG. 9 is a schematic view showing another configuration of the graphics rendering and editing apparatus.

The display 101 of the rendering and editing apparatus according to the above-described embodiment includes coordinates inputting function, a button information receiver, and a rendering and editing program. However, the present invention can be carried out with other embodiments. For example, as shown in FIG. 9, the graphics rendering and editing apparatus may be constructed by connecting a display 401 to a personal computer (hereinafter referred to as "PC") 402. In this graphics rendering and editing apparatus, a user sends button information to the PC 402 using a coordinates inputting device such as a mouse 403, the PC 402 executes the rendering and editing program, and the display 401 displays the result.

An embodiment of the present invention can be realized by a computer that executes the program. Moreover, examples of an embodiment of the present invention include media for supplying the program to a computer, such as computer-readable storage media like CD-ROM and communication media for transmitting the program, such as the Internet. Furthermore, the program is an example of an embodiment of the present invention. The program, storage media, communication media, and a program product are within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-100625, filed Apr. 8, 2008, and No. 2009-011367, filed Jan. 21, 2009, which are hereby incorporated by reference herein in their entirety.

What is claimed is:

1. A graphics editing apparatus, comprising:
a memory;
a processor coupled to the memory which executes the following:
drawing a straight line segment by designating a start point and an endpoint, edges of the straight line segment being at the start point and the end point;
setting, based on an operation of a pointer, points on the straight line segment as a first fixed point and a second fixed point to divide the straight line segment into three parts;
deforming the straight line segment by moving a control point which is on the straight line segment and is between the first fixed point and the second fixed point, to a position pointed by the pointer in such a way that a part of the straight the line segment which is between the first fixed point and the second fixed point is deformed to be a curved line by the moving of the control point which is between the first fixed point and the second fixed point and the other parts of the straight line segment which are not between the first fixed point and the second fixed point are not deformed by the moving of the control point which is between the first fixed point and the second fixed point; and
inputting information about sharpness of the straight line segment after being deformed,
wherein the straight line segment is deformed so that a shape of the straight line segment deformed in response to the moving of the control point is sharper when the information about the sharpness corresponds to sharpness which is a threshold value or larger, compared to when the information of the sharpness corresponds to sharpness which is less than the threshold value.

2. The graphics editing apparatus according to claim 1, further comprising inputting information about viscosity of the straight line segment, wherein the straight line segment is deformed so that a larger part of the straight line segment which is between the first fixed point and the second fixed point is deformed in response to the moving of the control point when the information about the viscosity corresponds to viscosity which is a threshold value or larger, compared to when the information of the viscosity corresponds to viscosity which is less than the threshold value.

3. The graphics editing apparatus according to claim 2, further comprising obtaining information about a speed of the moving of the control point for deforming the straight line segment, wherein the information about the speed obtained is inputted as the information about the viscosity.

4. The graphics editing apparatus according to claim 1, wherein a deformation amount is determined corresponding to each position on the straight line segment, based on a distance from the control point to the position of the control point after being moved by the pointer, and on respective distances from the first fixed point and the second fixed point to the position of the control point after being moved by the pointer.

5. A method for editing graphics, the method comprising:
drawing a straight line segment by designating a start point and an end point, edges of the straight line segment being at the start point and the end point;
setting, based on an operation of a pointer, points on the straight line segment as a first fixed point and a second fixed point to divide the straight line segment into three parts; and
deforming the straight line segment by moving a control point which is on the straight line segment and is between the first fixed point and the second fixed point, to a position pointed by the pointer in such a way that a part of the straight line segment which is between the first fixed point and the second fixed point is deformed to be a curved line by the moving of the control point which is between the first fixed point and the second fixed point and the other parts of the straight line segment which are not between the first fixed point and the second fixed point are not deformed by the moving of the control point which is between the first fixed point and the second fixed point; and
inputting information about viscosity of the straight line segment,
wherein the straight line segment is deformed so that a larger part of the straight line segment which is between the first fixed point and the second fixed point is deformed in response to the moving of the control point when the information about the viscosity corresponds to viscosity which is a threshold value or larger, compared to when the information of the viscosity corresponds to viscosity which is less than the threshold value.

6. The method according to claim 5, further comprising inputting information about sharpness of the straight line segment after being deformed,
wherein the straight line segment is deformed so that a shape of the straight line segment deformed in response to the moving of the control point is sharper when the information about the sharpness corresponds to sharpness which is a threshold value or larger, compared to when the information of the sharpness corresponds to sharpness which is less than the threshold value.

7. The method according to claim 5, further comprising obtaining information about a speed of the moving of the control point for deforming the straight line segment,
wherein the obtained information about the speed is input as the information about the viscosity.

8. The method according to claim 5, wherein, in the deforming, a deformation amount corresponding to each position on the straight line segment is determined based on a distance from the control point to the position of the control point after being moved by the pointer, and on respective distances from the first fixed point and the second fixed point to the position of the control point after being moved by the pointer.

9. A non-transitory computer-readable storage medium storing a program that causes a computer to execute a method for editing graphics, the method comprising:
drawing a straight line segment by designating a start point and an end point, edges of the straight line segment being at the start point and the end point;
setting, based on an operation of a pointer, points on the straight line segment as a first fixed point and a second fixed point to divide the straight line segment into three parts; and
deforming the straight line segment by moving a control point which is on the straight line segment and is between the first fixed point and the second fixed point, to a position pointed by the pointer in such a way that a part of the straight line segment which is between the first fixed point and the second fixed point is deformed to be a curved line by the moving of the control point which is between the first fixed point and the second fixed point and the parts of the straight line segment which are not between the first fixed point and the second fixed point are not deformed by the moving of the control point which is between the first fixed point and the second fixed point,
wherein the method further comprises inputting information about viscosity of the straight line segment, and
wherein the straight line segment is deformed so that a larger part of the straight line segment which is between the first fixed point and the second fixed point is deformed in response to the moving of the control point when the information about the viscosity corresponds to viscosity which is a threshold value or larger, compared to when the information of the viscosity corresponds to viscosity which is less than the threshold value.

10. The non-transitory computer-readable storage medium according to claim 9, wherein the method further comprises inputting information about sharpness of the straight line segment after being deformed, and
wherein the straight line segment is deformed so that a shape of the straight line segment deformed in response to the moving of the control point is sharper when the information about the sharpness corresponds to sharpness which is a threshold value or larger, compared to when the information of the sharpness corresponds to sharpness which is less than the threshold value.

11. The non-transitory computer-readable storage medium according to claim 9, wherein the method further comprises obtaining information about a speed of the moving of the control point for deforming the straight line segment, and
wherein the obtained information about the speed is input as the information about the viscosity.

12. The non-transitory computer-readable storage medium according to claim 9, wherein, in the deforming, a deformation amount corresponding to each position on the straight line segment is determined based on a distance from the control point to the position of the control point after being moved by the pointer, and on respective distances from the first fixed point and the second fixed point to the position of the control point after being moved by the pointer.

* * * * *